June 14, 1955
R. E. HARTSOCK ET AL
2,710,572
CULTIVATOR MOUNTING CLAMP
Original Filed July 8, 1943
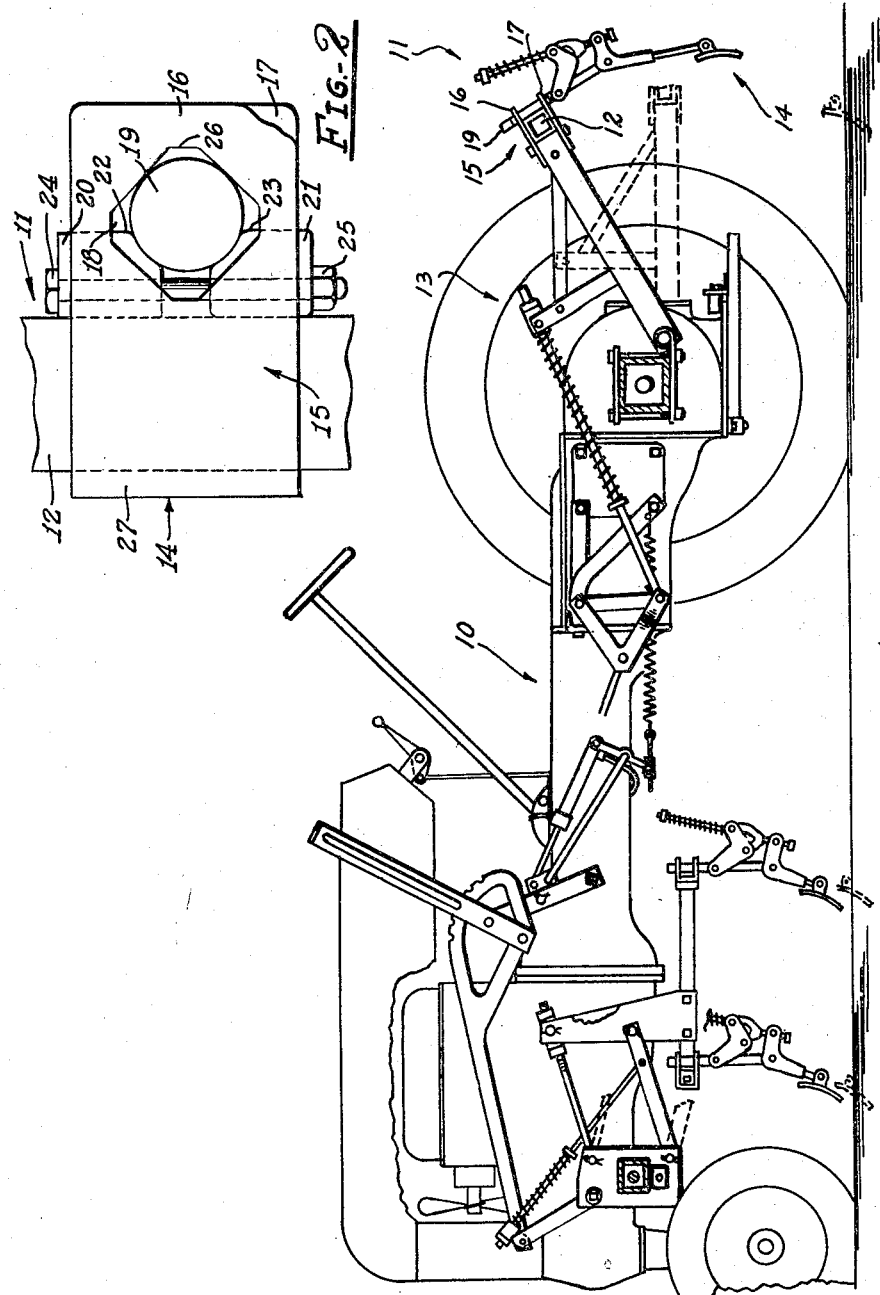
Inventors
Robert E. Hartsock
Richard W. Henss
By Emerson B Donnell
Attorney

United States Patent Office 2,710,572
Patented June 14, 1955

2,710,572
CULTIVATOR MOUNTING CLAMP

Robert E. Hartsock, La Habra, and Richard W. Henss, South Gate, Calif., assignors to J. I. Case Company, Racine, Wis., a corporation of Wisconsin Original application July 8, 1943, Serial No. 493,852, now Patent No. 2,482,751, dated September 27, 1949. Divided and this application September 26, 1949, Serial No. 117,924

2 Claims. (Cl. 97—198.1)

This invention relates to tractors and particularly to the type that carries cultivators and like implements. This application is a division of application Serial No. 493,852, filed July 8, 1943, for Tractor Implements and Control, issued as Patent No. 2,482,751, September 27, 1949.

The principal object of this invention is to provide a cultivator mounting clamp by which the shank of the shovel is secured to the cross beam or bail.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings:

Fig. 1 shows a left elevational view of a tractor embodying the invention used to hold rear mounted cultivator shovels and Fig. 2 is a fragmentary plan view of the invention.

The drawings show a tractor 10 having a rear mounted cultivator rig 11 of conventional design and which rig includes a cross beam or bail 12. Cross beam 12 as adapted to be raised or lowered by mechanism designated 13, which is not a part of this invention and will not be further described.

Beam 12 in this instance is of square cross-section so as to provide a rigid non-rotatable mounting for one or more cultivator shovels such as 14. Only one such assembly will be described as they are identical.

Specifically, the invention comprises a clamp 15 which embraces the beam 12 as shown in Figs. 1 and 2. Clamp 15 comprises an upper portion 16 and lower portion 17 which are provided with apertures 18 through which a cultivator shank 19 extends.

A pair of wedges 20 and 21 are interposed intermediate beam 12 and cultivator shank 19. Wedges 20 and 21 have inner ends provided with angular faces 22 and 23 respectively. Angular faces 22 and 23 contact opposed sides of shank 19. A bolt 24 is provided parallel to beam 12 and passes through wedges 20 and 21. A nut 25 on bolt 24, when tightened, draws wedges 20 and 21 toward each other, the result being that as angular faces 22 and 23 are drawn closer together the shank 19 is forced toward corner 26 of aperture 18 and contact of wedges 20 and 21 with beam 12 forces portion 27 of clamp 15 into contact with beam 12. The result being that cultivator shank 19 and clamp 15 will be held securely in place relative to beam 12.

The above being a complete description of an illustrative embodiment of the invention, what is claimed as new and desired to be secured by Letters Patent of the United States is:

1. In a clamp for an implement shank the combination of a supporting bar, a shank designed to be clamped in transverse relation to said bar, a bifurcated strap embracing said bar and having a solid portion disposed on one side of said bar and opposed apertured portions extending from the solid portion beyond the opposite side of the bar, said shank extending through said apertures on the side of said bar opposite said solid portion, a pair of wedging means spaced from each other longitudinally of said bar, introduced between said shank and said bar on the side opposite said solid portion, each of said wedging means individually engaging said shank, and means engaged with said wedging means and forcing them toward each other and toward said shank so as to force said shank away from said bar and into clamping engagement with the margins of said apertures remote from said bar.

2. In a clamp for an implement shank the combination of a supporting bar, an implement shank of round cross section designed to be clamped in transverse relation to said bar, a strap element having a solid portion disposed against said bar, upper and lower portions projecting from said solid portion above and below said bar, said projecting portions providing angulated apertures disposed beyond said bar relatively to said solid portion, said round shank extending through said apertures, a pair of wedges spaced from each other longitudinally of said bar, disposed against said bar on the side opposite said solid portion and between said bar and said shank and having inclined surfaces, each in contact with said shank, and a bolt engaged with said wedges and forcing them toward each other and against said shank so as to force said shank away from said bar and into clamping relation with the margins of said angulated apertures.

References Cited in the file of this patent

UNITED STATES PATENTS

| | | |
|---|---|---|
| 506,654 | Baldwin | Oct. 17, 1893 |
| 600,864 | Glover | Mar. 22, 1898 |
| 670,071 | Willis | Mar. 19, 1901 |
| 807,342 | Willmore et al. | Dec. 12, 1905 |
| 823,324 | Dunlop | June 12, 1906 |
| 2,562,486 | Denning | July 31, 1951 |

FOREIGN PATENTS

| | | |
|---|---|---|
| 518,123 | France | Dec. 27, 1920 |
| 463,198 | Germany | July 25, 1928 |
| 7,746 | Great Britain | May 17, 1890 |